June 11, 1929.  R. O. MILLER  1,716,971

POWER TRANSMISSION MECHANISM

Filed Dec. 1, 1926

INVENTOR
Robert O. Miller
BY
H. G. Manning
ATTORNEY

Patented June 11, 1929.

1,716,971

UNITED STATES PATENT OFFICE.

ROBERT OLCOTT MILLER, OF NEW BRITAIN, CONNECTICUT.

POWER-TRANSMISSION MECHANISM.

Application filed December 1, 1926. Serial No. 151,976.

This invention relates to power transmission mechanisms, and more particularly to a machine having two shafts operated in the same direction by a single drive, and in which one of said shafts is driven at double the speed of the other.

One object of this invention is to provide a machine of the above nature having no reduction gears, friction drives, complicated belting arrangements, sprocket wheels, or chains.

A further object of this invention is to provide a power transmission mechanism of the above nature especially adapted for simultaneously operating cutters for use on metals of different degrees of hardness.

A further object is to provide a machine of the above nature which will be simple in construction, inexpensive to manufacture, easy to install and manipulate, compact, and very efficient and durable in use.

With these and other objects in view there has been illustrated on the accompanying drawing one form in which the invention may be conveniently embodied in practice.

Figure 1:
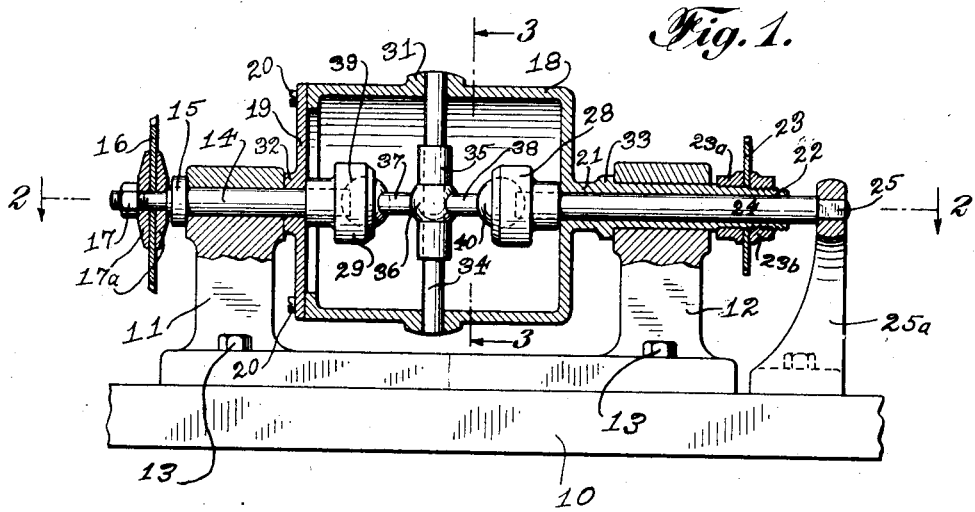
Fig. 1 represents a front view of the machine, shown partly in section.

In the manufacture of finished keys from key blanks, some of which are generally made from hard metal such as steel, and others from soft metal such as German silver, it is often necessary to employ a pair of cutting wheels, one of which runs at a speed about twice that of the other. Ordinarily, to operate such cutting wheels, it was necessary to mount them on shafts driven by separate motors or other sources of power, or else to employ complicated gearing, belting, or friction drive arrangements.

By means of the present invention, the above and other disadvantages have been avoided, and a machine has been devised which will operate a pair of cutters from a single driving belt without the use of gearing, friction drives, or sprocket chain mechanisms.

It is to be understood that while the invention has been herein disclosed as applied to a machine for operating key cutters, it is not to be limited to such an application, but broadly covers any power transmission mechanism where it is desired to utilize a single drive to simultaneously rotate one shaft at double the speed of another and in the same direction.

Referring now to the drawings in which like reference numerals denote corresponding parts throughout the several views, the numeral 10 indicates a base adapted to support two bearing posts 11 and 12, said posts being secured to said base as by bolts 13. Mounted in the support 11 is a rotatable shaft 14, said shaft having at one end an adjusting collar 15, against which a relatively large circular cutter wheel or blade 16 is adapted to be held by a nut 17 threaded upon the end of the shaft 14. The cutter blade 16 is adapted to be clamped between a pair of flanges 17$^a$. The blade 16 is adapted to rotate rapidly for use in cutting keys of German silver or other soft metal. The other end 16$^a$ of the shaft 14 extends within a rotary drum or housing 18, said housing preferably being cylindrical. The housing 18 is normally closed by a cover plate 19 secured to said housing by screws 20. The other end of the housing 18 is integrally connected to a tubular shaft 21 journaled in the post 12, previously mentioned.

The end of the tubular shaft 21 is threaded at 22 to receive a relatively small cutter blade 23. The blade 23 is clamped between a pair of flanges 23$^a$ and 23$^b$, and said blade is adapted to rotate slowly, or at one-half the speed of the blade 16, for cutting keys of steel or other hard metal. The tubular shaft 21 is adapted to rotate upon a stationary shaft 24, said shaft being prevented from rotation in any suitable manner, as by providing it with a squared end 25, which is adapted to be located within a corresponding square hole in a holding post 25$^a$. The inner end 26 of the stationary shaft 24 extends within the drum or housing 18 and has a stationary crank arm 28 rigidly secured thereto, as by a pin 27. A similar crank arm 29 is secured upon the end of the rotatable shaft 14, as by a similar pin 30.

In order to permit the housing 18 to be driven by means of a belt or other source of power, not shown, the cylindrical rim of the housing 18 is provided at its center with an enlarged pulley section 31. The housing 18 is prevented from longitudinal motion to the left, as viewed in Fig. 1, by means of a hub 32 integral with the plate 19, and adapted to engage the post 11. The housing is prevented from moving to the right by an enlarged flange 33 provided on the tubular shaft 21, said enlarged flange engaging the post 12.

The pulley section 31 is provided with a pair of oppositely alined apertures extending through the housing and being adapted to support the ends of a transverse spindle 34 preferably by means of a friction fit, said spindle having a sleeve 35 slidably and rotatably mounted thereon. The sleeve 35 is provided at its center with an enlarged portion 36 from which a pair of side rods 37 and 38 extend in opposite directions. The rods 37 and 38 are provided on their ends with a pair of aperture balls 39 and 40, within which said rods are adapted to slide. The balls 39 and 40 are retained in spherical sockets 41 and 42 located in the ends of the cranks 29 and 28 respectively.

Figure 2:
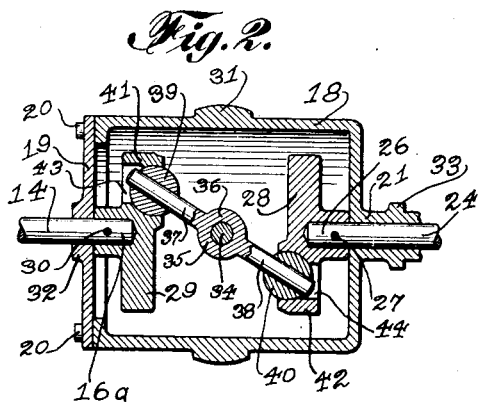
Fig. 2 is a longitudinal sectional view of the housing member, taken along the line 2—2 of Fig. 1, looking in the direction of the arrows.
Figure 3:
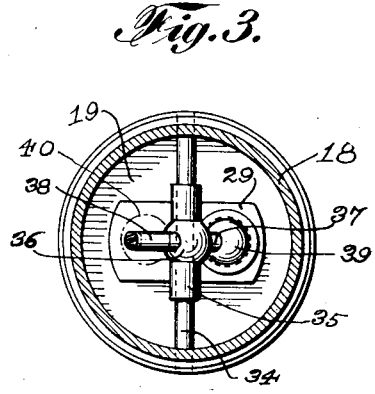
Fig. 3 is a transverse sectional view of the housing member, taken along the line 3—3 of Fig. 1, looking in the direction of the arrows.

As clearly shown in Fig. 2, the base of said sockets 41 and 42 are preferably although not necessarily provided with apertures 43 and 44 which permit the ends of the rods 37 and 38 to slide freely through said cranks. While ball and socket bearings for the rods 37 and 38 have been illustrating herein, it is within the scope of the invention to eliminate the balls and sockets and to allow the rods merely to slide in slots in the cranks 28 and 29.

Figure 4:
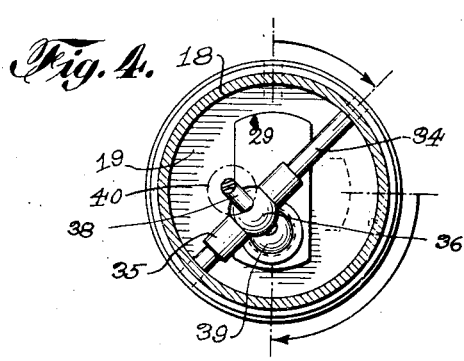
Fig. 4 is a transverse sectional view similar to Fig. 3, but with the housing shown rotated through an angle of 45 degrees.

In operation, as the housing 18 is rotated by the belt on the pulley section 31, since the right-hand shaft 24 is stationary, it will be understood that the right-hand crank 28 and the ball 40 will be held in one position. Consequently, when the spindle 34 of the housing rotates through an angle of 45 degrees from the dotted to the full line positions shown in Fig. 4 and as indicated by the arrow at the top of said figure, the movable crank 29 will turn through an angle of 90 degrees, from the dotted to the full line positions shown at the bottom of said figure and indicated by the lower arrow. Hence, the shaft 14 carrying the large cutter blade 16 will be caused to rotate twice as fast as the tubular shaft 21 carrying the small cutter blade 23, and it will be understood that both blades will turn in the same direction. During this operation, the sleeve 35 will slide up and down upon the spindle 34, and at the same time will rock back and forth. Meanwhile, the rods 37 and 38 will slide in the balls 39 and 40, the latter being caused to rock in their sockets 41 and 42.

While their has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a power transmission mechanism, a base, a housing having exterior power-receiving means on its periphery, a driven shaft supported on said base and extending into one end of said housing, a tubular shaft integral with the other end of said housing and supported by said base, a stationary shaft located within said tubular shaft and supported on its outer end by said base, a transverse spindle carried by said housing intermediate its ends, a sleeve slidably and rotatably mounted on said spindle, said sleeve having a pair of rods extending from opposite sides thereof, one of said rods being connected to said stationary shaft, a crank connected to the other rod for driving said driven shaft, and power delivering means on said driven shaft and said tubular shaft respectively.

2. In a power transmission mechanism, a base, a housing having exterior power-receiving means on its periphery, a driven shaft supported on said base and extending into one end of said housing, a tubular shaft integral with the other end of said housing and supported by said base, a stationary shaft located within said tubular shaft and supported on its outer end by said base, a transverse spindle carried by said housing intermediate its ends, a sleeve slidably and rotatably mounted on said spindle, said sleeve having a pair of rods extending from opposite sides thereof, one of said rods being connected to said stationary shaft, a crank connected to the other rod for driving said driven shaft, and work-cutting wheels on said driven shaft and tubular shaft respectively.

In testimony whereof, I have affixed my signature to this specification.

ROBERT OLCOTT MILLER.